United States Patent [19]
Yokota

[11] Patent Number: 5,824,747
[45] Date of Patent: Oct. 20, 1998

[54] GOLF BALL

[75] Inventor: Masatoshi Yokota, Shirakawa, Japan

[73] Assignee: Sumitomo Rubber Industries, Ltd., Hyogo-Ken, Japan

[21] Appl. No.: 722,497

[22] Filed: Sep. 27, 1996

[30] Foreign Application Priority Data

Sep. 29, 1995 [JP] Japan ................................. 7-276483

[51] Int. Cl.$^6$ ................................................ C08L 33/02
[52] U.S. Cl. ............................................ 525/221; 473/365
[58] Field of Search .............................. 525/221; 473/365

[56] References Cited

U.S. PATENT DOCUMENTS 4,884,814  12/1989  Sullivan .
5,321,089   6/1994  Cadorniga et al. .
5,633,322   5/1997  Yabuki et al. ........................... 473/365

FOREIGN PATENT DOCUMENTS 7-238193   9/1995   Japan .

*Primary Examiner*—Melvyn I. Marquis
*Assistant Examiner*—D. Aylward
*Attorney, Agent, or Firm*—Birch, Stewart, Kolasch & Birch, LLP

[57] ABSTRACT

A is a golf ball having good shot feel and controllability as well as excellent flight performance, which comprises a core and a cover covering the core, wherein the cover has a Shore D hardness of from 60 to 65 and a stiffness modulus of from 2,000 to 2,500 kgf/cm$^2$ and is formed from a specific mixture of three ionomer resins.

5 Claims, 1 Drawing Sheet

GOLF BALL

FIELD OF THE INVENTION

The present invention relates to a golf ball. More particularly, it relates to a golf ball having good shot feel (feeling at the time of hitting) and controllability as well as excellent flight performance.

BACKGROUND OF THE INVENTION

A solid golf ball, particularly a two-piece solid golf ball, is associated with disadvantages in that the shot feel is hard and poor because the cover is formed from a high-rigid ionomer resin and the controllability is poor because spin cannot be easily put on the golf ball. However, the two piece solid golf ball does show a trajectory referred to as a "straight ball" and attains a long flight distance, thus showing good flight performance.

An improvement in the shot feel and controllability of the two piece solid golf ball has been achieved by utilizing softening ionomer resins. However, softening adversely reduces the repulsion of the golf ball and reduces the flight performance, thus reducing flight distance.

OBJECTS OF THE INVENTION

In order to solve the above problem, the present inventors have intensively studied and have found that a golf ball having good shot feel and controllability as well as excellent flight performance can be obtained by using a mixture of a high-rigid ionomer resin, a moderate-rigid ionomer resin and a low-rigid ionomer resin as a base resin for the cover.

Accordingly, an object of the present invention is to provide a golf ball having good shot feel and controllability as well as excellent flight performance.

BRIEF EXPLANATION OF THE DRAWINGS

The above object as well as other objects and advantages of the present invention will become apparent to those skilled in the art from the following description with reference to the accompanying drawings, wherein.

SUMMARY OF THE INVENTION

Figure 1:
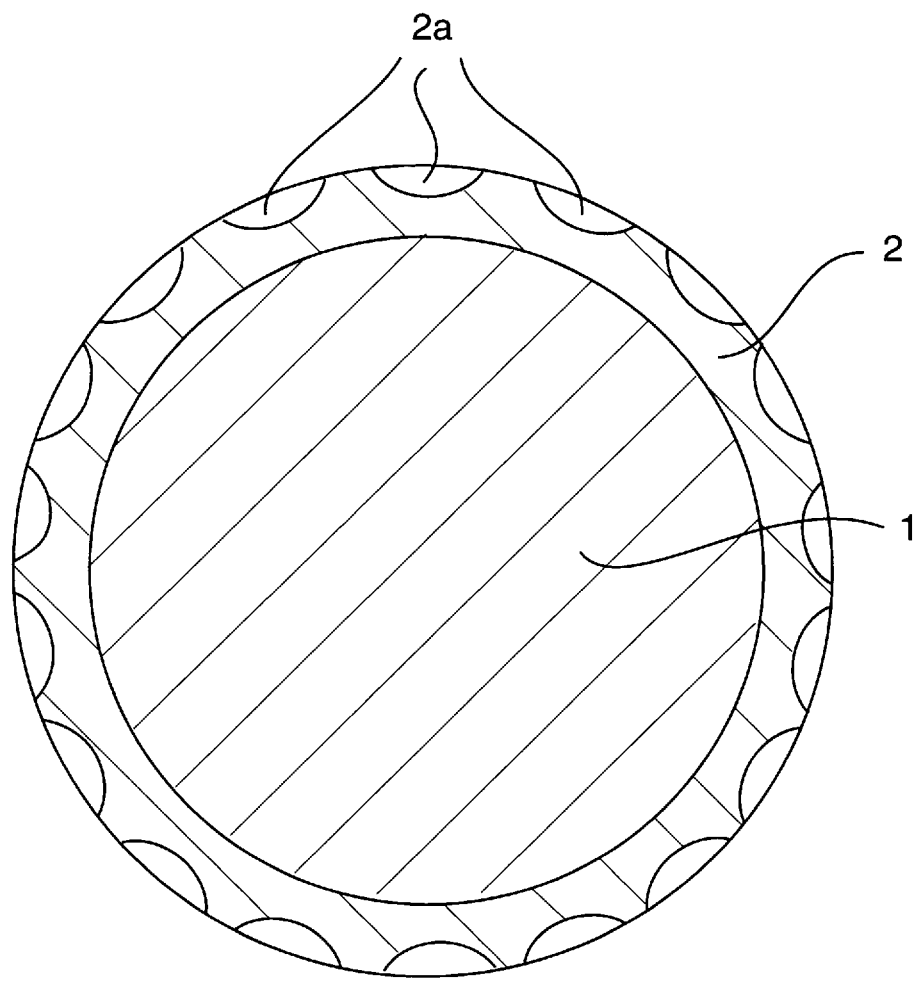
FIG. 1 is a schematic cross section illustrating one embodiment of the golf ball of the present invention.

The present invention provides a golf ball which comprises a core and a cover covering the core, wherein the cover has a Shore D hardness of from 60 to 65 and a stiffness modulus of from 2,000 to 2,500 kgf/cm$^2$ and is formed from a mixture of:

Resin (A): a monovalent or divalent metal salt of a copolymer of ethylene and acrylic acid or methacrylic acid, which has a Shore D hardness of 65 to 70 and a stiffness modulus of 3,000 to 4,500 kgf/cm$^2$;

Resin (B): a monovalent or divalent metal salt of a copolymer of ethylene and acrylic acid or methacrylic acid, which has a Shore D hardness of 55 to 65 and a stiffness modulus of 1,300 to 3,000 kgf/cm$^{2+}$; and Resin (C): a monovalent or divalent metal salt of a terpolymer of ethylene, acrylic acid or methacrylic acid and acrylate or methacrylate, which has a Shore D hardness of 50 to 60 and a stiffness modulus of 700 to 1,300 kgf/cm$^2$.

DETAILED DESCRIPTION OF THE INVENTION

In the present invention, it is necessary that the cover has a Shore D hardness of from 60 to 65. If the Shore D hardness of the cover is lower than 60, the cover is too soft and the repulsion is deteriorated, thus reducing flight performance and lowering flight distance. If the Shore D hardness of the cover is higher than 65, the cover is too hard, and shot feel and controllability are poor.

In the present invention, it is necessary that the stiffness modulus of the cover is from 2,000 to 2,500 kgf/cm$^2$. When the stiffness modulus of the cover is lower than 2,000 kg/cm$^2$, the cover is too soft and the repulsion is deteriorated, thus reducing flight performance When the stiffness modulus of the cover is higher than 2,500 kg/cm$^2$, the cover is too hard and it is impossible to obtain a suitable amount of backspin. Therefore, controllability and shot feel are poor.

In the present invention, the stiffness modulus is determined by using a resin sheet formed from the cover resin composition, because the stiffness modulus of the cover of the molded golf ball is hardly measured by current technique. It is considered that the stiffness modulus of the cover is substantially the same as that of the cover resin composition, although the stiffness modulus of the cover of the molded golf ball is not actually measured.

On the other hand, the Shore D hardness can be directly determined from the molded golf ball. Nevertheless the measurement of the Shore D hardness is generally conducted using a test piece made from the cover resin composition. The Shore D hardness of the test piece thus made from the cover composition is substantially the same as that of the cover of the molded golf ball.

Next, resin (A), resin (B) and resin (C) will be explained in detail.

In the present invention, resin (A) is a monovalent or divalent metal salt of a copolymer of ethylene and acrylic acid or methacrylic acid and is referred to as a "high-rigid ionomer resin." Examples of metal species of a metal ion which neutralize some of carboxyl groups of the copolymer to form metal salt include monovalent metals such as sodium (Na), lithium (Li), potassium (K), etc.; and divalent metals such as zinc, magnesium, calcium, etc. Specific examples of the resin (A) include Hi-milan #1605, (Na), Hi-milan #1707 (Na), Hi-milan AM7318 (Na) and Hi-milan AM7315 (Zn), manufactured by Mitsui Du Pont Polychemical Co., Ltd.; Surlyn #8940 (Na), Surlyn #8920 (Na) and Surlyn #7940 (Li), manufactured by Du Pont U.S.A. Co.; and Iotek 8000 (Na) manufactured by Exxon Chemical Co. These are used alone or in combination thereof. Na, Zn or Li described in parentheses which are provided at the back of the trade name of the ionomer resins respectively indicates neutralizing ion metal species. As to resin (A), sodium salts are particularly preferred because of high repulsion.

In the present invention, it is necessary that the Shore D hardness and stiffness modulus of resin (A) are respectively within a range from 65 to 70 and 3,000 to 4,500 kgf/cm$^2$. When the Shore D hardness of the resin (A) is lower than 65, the cover is too soft and, therefore, the repulsion is deteriorated and flight performance is deteriorated. On the other hand, when the Shore D hardness of resin (A) is higher than 70, the cover is too hard and, therefore, shot feel and controllability are poor. When the stiffness modulus of resin (A) is lower than 3,000 kg/cm$^2$, repulsion and flight performance is deteriorated. On the other hand, when the stiffness modulus of the resin (A) is higher than 4500 kg/cm$^2$, shot feel and controllability are poor.

Resin (B) is a monovalent or divalent metal salt of a copolymer of ethylene and acrylic acid or methacrylic acid and is referred to as a "moderate-rigid ionomer resin."

Specific examples thereof include Hi-milan #1555 (Na), Hi-milan #1557 (Zn), Hi-milan #1652 (Zn) and Hi-milan #1702 (Zn), manufactured by Mitsui Du Pont Polychemical Co., Ltd. These are used alone or in combination thereof. As the resin (B), zinc salts are particularly preferred because of good controllability.

In the present invention, it is necessary that the Shore D hardness and stiffness modulus of the resin (B) are respectively within a range from 55 to 65 and 1,300 to 3,000 kgf/cm$^2$. When the Shore D hardness of the resin (B) is lower than 55, the cover is too soft and, therefore, repulsion and flight performance is deteriorated. On the other hand, when the Shore D hardness of the resin (B) is higher than 65, the cover is too hard and, therefore, shot feel and controllability are poor. When the stiffness modulus of the resin (B) is lower than 1,300 kgf/cm$^2$, repulsion and flight performance is deteriorated. On the other hand, when the stiffness modulus of the resin (B) is higher than 3000 kg/cm$^2$, shot feel and controllability are poor.

The resin (C) is a monovalent or divalent metal salt of a terpolymer of ethylene, acrylic acid or methacrylic acid and acrylate or methacrylate and is referred to as a "low-rigid ionomer resin." Specific examples thereof include Hi-milan #1855 (Zn) and Hi-milan #1856 (Na), manufactured by Mitsui Du Pont Polychemical Co., Ltd. These are used alone or in combination thereof.

In the present invention, it is necessary that the Shore D hardness and stiffness modulus of resin (C) are respectively within a range of from 50 to 60 and 700 to 1,300 kgf/cm$^2$. When the Shore D hardness of the resin (C) is lower than 50, the cover is too soft and, therefore, repulsion and flight performance is deteriorated. On the other hand, when the Shore D hardness of the resin (C) is higher than 60, the cover is too hard and, therefore, the shot feel and controllability are poor. When the stiffness modulus of the resin (C) is lower than 700 kgf/cm$^2$, the repulsion and the flight performance are deteriorated. On the other hand, when the stiffness modulus of the resin (C) is higher than 1,300 kgf/cm$^2$, it is difficult to improve shot feel and controllability while maintaining good flight performance.

In the present invention, a mixing ratio of the resin (A) to the resin (B) and resin (C) may be anyone capable of adjusting the Shore D hardness of the cover to 60 to 65 and adjusting the stiffness modulus of the composition for cover to 2,000 to 2,500 kgf/cm$^2$ and is not specifically limited. It is preferred that the amount of resin (A), resin (B) and resin (C) in the mixture is from 15 to 40% by weight, 20 to 50% by weight and 20 to 60% by weight. Since the cover is mainly composed of the mixture of the resin (A), resin (B) and resin (C) and only a small amount of pigments such as titanium dioxide is added, the Shore D hardness of the cover and stiffness modulus of the cover composition are substantially the same as the Shore D hardness and stiffness modulus of the mixture of the resin (A), resin (B) and resin (C). The listed examples of the resin (A), resin (B) and resin (C) are merely illustrative and not limited thereto.

In the present invention, it is possible to obtain the desired characteristics by using the mixture of the resin (A), resin (B) and resin (C) as the base resin for the cover. The above resins are generally mixed at 150° to 260° C. for 0.5 to 15 minutes using an internal mixer such as a kneading type two-screw extruder, a Banbury mixer, a kneader, etc.

In the present invention, various additives such as pigments, dispersants, antioxidants, UV absorbers, photostabilizers, fluorescent brighteners, etc. can be optionally added in the cover resin composition, in addition to the mixture of resin (A), resin (B) and resin (C). Further, other resins can also be added unless the characteristics of the mixture of the resin (A), resin (B) and resin (C) are damaged. When the cover composition is prepared by adding other resins, the amount of the mixture of the resin (A), resin (B) and resin (C) in the resin component is preferably not less than 70% by weight, particularly not less than 80% by weight. In the present invention, the resin (A), resin (B) and resin (C) may be mixed with the other additives after previously mixing them, or may be mixed with the other additives when preparing the cover composition. The thickness of the cover is generally from 0.5 to 3 mm, preferably from 1.5 to 2 mm.

A golf ball can be obtained by covering the cover on the core. The core can be any any one used for a solid golf ball (solid core) or for a thread wound golf ball (thread wound core).

The solid core may be not only a single structure core but also may be a multi-layer (two or more layers) structure core. For example, the core for a two-piece golf ball is obtained by subjecting a rubber composition to a press vulcanization to compress with heating (e.g. at a temperature of 140° to 170° C. for 10 to 40 minutes) into a spherical vulcanized article. The rubber composition may be prepared by formulating 10 to 60 parts by weight of at least one vulcanizing agent (crosslinking agent) of α,β-ethylenically unsaturated carboxylic acids (e.g. acrylic acid, methacrylic acid, etc.) or metal salts thereof and functional monomers (e.g. trimethylolpropane trimethacrylate, etc.), 3 to 30 parts by weight of a filler (e.g. zinc oxide, barium sulfate, etc.), 0.5 to 5 parts by weight of a peroxide (e.g. dicumyl peroxide, etc.) and 0.1 to 1 parts by weight of an antioxidant, based on 100 parts by weight of polybutadiene.

The thread wound core is composed of a center and a thread rubber layer wound on the center. The center can be either of a liquid center or a rubber center. The rubber center can be obtained by vulcanizing the same rubber composition as that of the solid core.

The thread rubber may be those which have heretofore been used. For example, it can be obtained by vulcanizing a rubber composition which comprises a natural rubber or a combination of a natural rubber and synthetic polyisoprene, an antioxidant, a vulcanizing accelerator and sulfur. The solid core and thread wound core as explained above are merely illustrative and are not limited thereto.

A method of covering the cover on the core is not specifically limited, but may be a conventional method. For example, a cover composition is prepared by adding a suitable amount of additives in the mixture of resin (A), resin (B) and resin (C) and molding it into semi-spherical half-shells which are then covered on a core and pressure-molding at 130° to 170° C. for 1 to 5 minutes. Also, the same cover composition may be directly injection-molded on a core. During cover molding, dimples may be formed on the surface of the ball, if necessary. Further, a paint or marking may be optionally provided after cover molding.

Next, one embodiment of the structure of the golf ball of the present invention will be explained with reference to the accompanying drawing. FIG. 1 is a schematic cross section illustrating one embodiment of the golf ball of the present invention. The golf ball shown in FIG. 1 is a two-piece solid golf ball comprising a core 1 of a vulcanized molded article of a rubber composition and a cover 2 covering the core. The core 1 is a solid core but is not limited thereto. For example, the core 1 may be a vulcanized molded article of the rubber composition comprising polybutadiene as a main material, and the cover 2 may be formed from the cover composition containing the mixture of the resin (A), resin (B) and resin (C) as the base resin. In addition, 2a is a dimple provided on the cover 2. In the golf ball shown in FIG. 1, the core 1 is made of a single-layer structure vulcanized molded article of the rubber composition, but it may be a two-layer structure solid core obtained by further forming an outer core of the vulcanized molded article of the rubber composition comprising polybutadiene as the main material around an inner core of the vulcanized molded article of the rubber composition comprising polybutadiene as the main material, or a thread wound core comprising a center and a thread rubber wound on the center.

The suitable number and embodiment of the dimples 2a are optionally provided on the cover 2 of the golf ball so as to obtain the desired characteristics. Further, a paint or marking may be optionally provided on the surface of the golf ball.

As described above, according to the present invention, there is provided a golf ball having good shot feel and controllability as well as excellent flight performance.

EXAMPLES

The following Examples and Comparative Examples further illustrate the present invention in detail but are not to be construed to limit the scope thereof.

Examples 1 to 3 and Comparative Examples 1 to 3

Golf balls of Examples 1 to 3 and Comparative Examples 1 to 3 were produced via steps shown in the following Items (1) to (3).

(1) Production of Core

A rubber composition prepared by formulating 30 parts by weight of zinc acrylate, 17 parts by weight of zinc oxide, 1.2 parts by weight of dicumyl peroxide and 0.5 parts by weight of an antioxidant [Yoshinox 425 (trade name), manufactured by Yoshitomi Pharmaceutical Industries, Ltd.] into 100 parts by weight of polybutadiene [BR-11 (trade name), manufactured by Japan Synthetic Rubber Co., Ltd.] was vulcanization-molded at 150° C. for 30 minutes to produce a solid core having a diameter of 39.0 mm.

(2) Production of Cover Composition

Ingredients shown in Table 1 were mixed using a kneading type twin-screw extruder to prepare a pelletized cover composition. In Table 1, the stiffness modulus and Shore D hardness are shown, together with the cover composition. The unit of the amount of the respective ingredients in Table 1 is part by weight. Since the resin (A), resin (B) and resin (C) are indicated by the trade name in Table 1, their details are shown at the back of Table 1.

The extrusion conditions are as follows: a screw diameter: 45 mm; a screw revolution per minute: 200 rpm; a screw L/D: 35. The formulation ingredients were heated at 220° to 260° C. at the die position of the extruder. The measuring methods of the Shore D hardness and stiffness modulus are as follows.

Shore D Hardness

It is measured according to ASTM D-2240 after a hot-press molded sheet having a thickness of about 2 mm was produced from the cover composition and preserved at 23° C. for two weeks.

Stiffness Modulus

It is measured according to ASTM D-747 after a hot-press molded sheet having a thickness of about 2 mm was produced from the cover composition and preserved at 23° C. for two weeks.

The cover composition of Comparative Example 1 will be explained below. That is, the cover composition of Comparative Example 1 is obtained by using only a high-rigid ionomer resin as the base resin and the cover composition of Comparative Example 1 corresponds to a composition for conventional ionomer resin cover. The golf ball of Comparative Example 1 using this cover composition is a golf ball for criterion of comparison.

(3) Production of Golf Ball

A two-piece solid golf ball having an outer diameter of 42.7 mm was produced by injection-molding the cover composition of the above item (2) directly on the solid core of the above item (1) to cover the solid core and painting the resulting golf ball.

The ball weight, compression (PGA), flight distance (carry), spin amount, shot feel and controllability at the time of approach shot of the golf ball thus obtained were measured. The results are shown in Table 2. The measurement and evaluation methods of the flight distance, spin amount, shot feel and controllability at the time of approach are as follows. In addition, the flight distance was examined in case of hitting with a No. 1 wood club and the spin amount was examined in case of hitting with a No. 9 iron club.

Flight Distance and Spin Amount

A No. 1 wood club was fitted to a swing robot manufactured by True Temper Co. and a golf ball was hit at a head speed of 45 m/second, and then a distance to the dropping point was measured and the resultant distance was taken as the flight distance. The spin amount is determined by continuously taking a photo of the hit golf ball. In Table 2, the case of hitting with this No. 1 wood club is represented as "W#1 45 m/second."

A No. 9 iron club was fitted to a swing robot manufactured by True Temper Co. and a golf ball was hit at a head speed of 34 n/second, and then the spin amount is determined by continuously taking a photo of the hit golf ball. In Table 2, the case of hitting with this No. 9 iron club is represented as "I#9 34 m/second."

Shot Feel

It is evaluated by practically hitting the golf ball with a No. 1 wood club by 15 golfers (9 professional golfers and 6 amateur golfers).

The evaluation criteria are as follows.

Evaluation Criteria of Results

O: Not less than 10 out of 15 golfers replied "good."

Δ: About 5 to 9 out of 15 golfers replied "good."

X: Not more than 4 out of 15 golfers replied "good."

Controllability at the Time of Approach

It is evaluated by practically hitting the golf ball with a pitching wedge by 15 golfers (9 professional golfers and 6 amateur golfers). The evaluation criteria are as follows.

Evaluation Criteria of Results

O: Not less than 10 out of 15 golfers replied "good."

Δ: About 5 to 9 out of 15 golfers replied "good."

X: Not more than 4 out of 15 golfers replied "good."

TABLE 1

|  |  | Example No. | | | Comparative Example No. | | |
|---|---|---|---|---|---|---|---|
|  |  | 1 | 2 | 3 | 1 | 2 | 3 |
| Resin (A): | | | | | | | |
| Hi-milan 1605 | ※1 | 30 | 0 | 0 | 50 | 20 | 35 |
| Hi-milan 1706 | ※2 | 0 | 0 | 0 | 50 | 0 | 0 |
| Hi-milan 1707 | ※3 | 0 | 20 | 30 | 0 | 0 | 0 |
| Resin (B): | | | | | | | |
| Hi-milan 1557 | ※4 | 30 | 30 | 0 | 0 | 0 | 0 |
| Hi-milan 1652 | ※5 | 0 | 0 | 40 | 0 | 0 | 0 |
| Resin (C): | | | | | | | |
| Hi-milan 1855 | ※6 | 0 | 50 | 30 | 0 | 80 | 65 |
| Hi-milan 1856 | ※7 | 40 | 0 | 0 | 0 | 0 | 0 |
| Titanium dioxide | | 2 | 2 | 2 | 2 | 2 | 2 |
| Shore D hardness | | 64 | 63 | 62 | 69 | 58 | 64 |
| Stiffness modulus (kgf/cm$^2$) | | 2400 | 2280 | 2300 | 3480 | 1450 | 2100 |

※1: Hi-milan 1605 (trade name), ionomer resin of a copolymer of ethylene and methacrylic acid, obtained by neutralizing with a sodium ion, manufactured by Mitsui Du Pont Polychemical Co., Shore D hardness: 67, stiffness modulus: 3800 kgf/cm$^2$
※2: Hi-milan 1706 (trade name), ionomer resin of a copolymer of ethylene and methacrylic acid, obtained by neutralizing with a zinc ion, manufactured by Mitsui Du Pont Polychemical Co., Shore D hardness: 66, stiffness modulus: 3400 kgf/cm$^2$
※3: Hi-milan 1707 (trade name), ionomer resin of a copolymer of ethylene and methacrylic acid, obtained by neutralizing with a sodium ion, manufactured by Mitsui Du Pont Polychemical Co., Shore D hardness: 68, stiffness modulus: 3900 kgf/cm$^2$
※4: Hi-milan 1557 (trade name), ionomer resin of a copolymer of ethylene and methacrylic acid, obtained by neutralizing with a zinc ion, manufactured by Mitsui Du Pont Polychemical Co., Shore D hardness: 63, stiffness modulus: 2600 kgf/cm$^2$
※5: Hi-milan 1652 (trade name), ionomer resin of a copolymer of ethylene and methacrylic acid, obtained by neutralizing with a zinc ion, manufactured by Mitsui Du Pont Polychemical Co., Shore D hardness: 57, stiffness modulus: 1600 kgf/cm$^2$
※6: Hi-milan 1855 (trade name), ionomer resin of a terpolymer of ethylene, methacrylic acid and acrylate, obtained by neutralizing with a zinc ion, manufactured by Mitsui Du Pont Polychemical Co., Shore D hardness: 56, stiffness modulus: 900 kgf/cm$^2$
※7: Hi-milan 1856 (trade name), ionomer resin of a terpolymer of ethylene, methacrylic acid and acrylate, obtained by neutralizing with a sodium ion, manufactured by Mitsui Du Pont Polychemical Co., Shore D hardness: 58, stiffness modulus: 700 kgf/cm$^2$

TABLE 2

|  |  | Example No. | | | Comparative Example No. | | |
|---|---|---|---|---|---|---|---|
|  |  | 1 | 2 | 3 | 1 | 2 | 3 |
| Ball weight (g) | | 45.4 | 45.3 | 45.3 | 45.4 | 45.4 | 45.3 |
| Compression | | 95 | 95 | 94 | 97 | 90 | 94 |
| W#1 | 45 m/s: | | | | | | |
|  | Flight distance (yard) | 229 | 230 | 228 | 229 | 224 | 226 |
|  | Spin amount (rpm) | 2400 | 2450 | 2500 | 2400 | 2900 | 2600 |
| I#9 | 34 m/s: | | | | | | |
|  | Spin amount (rpm) | 7500 | 7600 | 7800 | 7000 | 8200 | 7400 |
| Shot feel | | ○ | ○ | ○ | X | ○ | Δ |
| Controllability at the time of approach shot | | ○ | ○ | ○ | X | ○ | Δ |

As is shown in Table 2, the golf balls of Examples 1 to 3 showed good shot feel and controllability as well as excellent flight performance and attained a large flight distance.

To the contrary, the golf ball of Comparative Example 1 attained a large distance but was poor in shot feel and controllability because only a high-rigid ionomer resin was used as the base resin for cover.

The golf ball of Comparative Example 2 was superior in shot feel and controllability because of low Shore D hardness and stiffness modulus. However, the flight distance was small (224 yard) in comparison with the flight distance (228 to 230 yard) of the golf balls of Examples 1 to 3. In addition, the spin amount in case of hitting with a No. 1 wood club was large (2900 rpm) and, therefore, the movement in both directions was large.

The golf ball of Comparative Example 3 was poor in flight distance, shot feel and controllability to the golf balls of Examples 1 to 3 because the resin (B) was not formulated.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A golf ball comprising a core and a cover covering the core, wherein the cover has a Shore D hardness of from 60 to 65 and a stiffness modulus of from 2,000 to 2,500 kgf/cm$^2$ and is formed from a mixture of:

Resin (A): a monovalent or divalent metal salt of a copolymer of ethylene and acrylic acid or methacrylic acid, which has a Shore D hardness of 65 to 70 and a stiffness modulus of 3,000 to 4,500 kgf/cm$^2$;

Resin (B): a monovalent or divalent metal salt of a copolymer of ethylene and acrylic acid or methacrylic acid, which has a Shore D hardness of 55 to 65 and a stiffness modulus of 1,300 to 3,000 kgf/cm$^2$; and Resin (C): a monovalent or divalent metal salt of a terpolymer of ethylene, acrylic acid or methacrylic acid and acrylate or methacrylate, which has a Shore D hardness of 50 to 60 and a stiffness modulus of 700 to 1,300 kgf/cm$^2$.

2. The golf ball according to claim i, wherein the mixture of resin (A), resin (B) and resin (C) contains the resin A in an amount of from 15 to 40% by weight, the resin B in an amount of 20 to 50% by weight and resin C in an amount of 20 to 60% by weight.

3. The golf ball according to claim 1, wherein the resin (A), resin (B) and resin (C) comprise a salt of sodium, lithium or zinc.

4. The golf ball according to claim 1, wherein resin (A) is a sodium salt, resin (B) is a zinc salt and resin (C) is a sodium or zinc salt.

5. The golf ball according to claim 1, wherein the cover has a thickness of from 1.5 to 2 mm.

* * * * *